United States Patent Office 3,629,337
Patented Dec. 21, 1971

3,629,337
PROCESS FOR PREPARING 5,8-DIMETHYL-5,6,7,8-TETRAHYDRO-1-NAPHTHOLS
Edward R. Degginger, Convent Station, and James M. Balquist, Morristown, N.J., assignors to Allied Chemical Corporation, New York, N.Y.
No Drawing. Filed Jan. 8, 1970, Ser. No. 1,566
Int. Cl. C07c 43/22, 39/12
U.S. Cl. 260—613           9 Claims

ABSTRACT OF THE DISCLOSURE 5,8-dimethyl-5,6,7,8-tetrahydro-1-naphthols are prepared by reacting 1,5-hexadiene with a substituted or unsubstituted phenol in the presence of a triphenoxy aluminum catalyst. The naphthols can be converted to the corresponding N-substituted carbamates by reaction with an isocyanate. The carbamates are useful as insecticides, miticides, and nematocides.

BACKGROUND OF THE INVENTION

This invention relates to a process for preparing 5,8-dimethyl-5,6,7,8-tetrahydro-1-naphthols.

The preparation of tetrahydronaphthol derivatives by reacting a 1,5-hexadiene with either substituted or unsubstituted phenol is disclosed in an article by Bruson and Kroeger appearing in volume 62 of The Journal of the American Chemical Society at page 36. The authors coined the term "cyclialkylation" to describe this type of reaction. According to the article, the reaction of phenol with 2,5-dimethyl-1,5-hexadiene in the presence of anhydrous aluminum chloride produces 5,5,8,8-tetramethyl-5,6,7,8-tetrahydro-2-naphthol. The article further indicates that neither the corresponding 1-naphthol isomer nor open chain monoalkylation products are obtained. Furthermore, although aluminum chloride is the classical example of a Friedel-Crafts type catalyst, when the reaction was repeated using other Friedel-Crafts type catalysts, viz, sulfuric acid and boron trifluoride, a hydroxyindane derivative was obtained rather than the tetramethyltetrahydronaphthol.

British Patent 706,425 discloses that the reaction of phenol with 2,5-dimethyl-1,5-hexadiene in the presence of boron trifluoride-glacial acetic acid catalyst produces only open chain alkylation products and no naphthol derivatives.

The reaction of p-cresol with 1,5-hexadiene in the presence of $ZnCl_2$ or $C_2H_5OSO_3H$, which are also Friedel-Crafts type catalysts, to produce a 1:1 mixture of 4-methyl-2-(1-hexen-5-yl)phenol and 4,5,8-trimethyltetrahydro-1-naphthol is reported in a note appearing in Chemical Abstracts, volume 65, 8802a.

No utility is disclosed in either the Bruson and Kroeger article or the Chemical Abstracts note for the tetrahydronaphthols described therein.

It is an object of this invention to provide an improved method for preparing 5,8-dimethyl-5,6,7,8-tetrahydronaphthols.

SUMMARY OF THE INVENTION

In accordance with this invention, 5,8-dimethyl-5,6,7,8-tetrahydro-1-naphthols having the formula

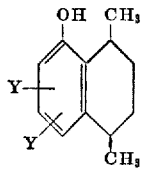

wherein X and Y independently occupy the 2,3, or 4 positions and are independently selected from the group consisting of hydrogen, fluorine, chlorine, bromine, lower, alkoxy and lower alkyl, are prepared by reacting 1,5-hexadiene with a phenolic reactant having the formula

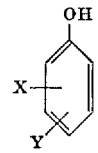

wherein X and Y have the meanings given above, in the presence of an aluminum phenate (triphenoxy aluminum) catalyst. If X or Y is lower alkoxy, the other substituent is preferably hydrogen; if X or Y is fluoride, chloride, or bromine, the other substituent is preferably hydrogen or a like halogen; and if X or Y is lower alkyl, the other substituent is preferably hydrogen or lower alkyl. The terms "lower alkoxy" and "lower alkyl" refer to such groups having from 1 to 4 carbon atoms.

The reaction can be carried out at temperatures ranging from about 125° C. to about 250° C., with the preferred temperature range being from about 160° C. to about 230° C.

The reaction proceeds readily at atmospheric pressure, but pressures above or below atmospheric can be used if desired.

The reactants can be added to the reaction mixture in any desired ratio, but normally it is desirable to employ an excess of the phenolic reactant. If desired, an inert solvent, such as chlorobenzene or nitrobenzene, can also be added to the reaction mixture.

The weight ratio of catalyst to 1,5-hexadiene can be from about 1:100 to about 1:0.5, with the preferred ratio being from about 1:10 to about 1:1.

The aluminum phenate catalyst can be prepared in situ by heating a suspension of aluminum and the phenolic reactant to be employed to between about 150° C. and about 200° C. until hydrogen evolution has ceased. Alternatively, the aluminum phenate catalyst can be prepared beforehand from the same or different phenolic reactant and stored prior to use. As used herein and in the appended claims, the term "aluminum phenate" includes aluminum phenates derived from phenolic reactants having the formula

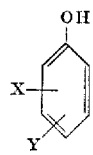

wherein X and Y are as defined herein.

The use of aluminum phenate as catalyst in the process of this invention offers several advantages over the use of other possible catalysts. The catalyst is relatively inexpensive, can readily be prepared in situ, and affords a high yield of the desired 5,8-dimethyl-5,6,7,8-tetrahydro-1-naphthol reaction product.

The naphthols of this invention can be converted to the corresponding N-substituted carbamates, which are useful as pesticides, by reaction with an isocyanate of the formula RNCO wherein R is an alkyl or phenyl radical. The alkyl radical can include a cycloaliphatic ring. R is preferably phenyl or an alkyl radical of 1 to 6 carbon atoms. The reaction is preferably carried out in the presence of an excess of the isocyanate, which also serves as a solvent for the naphthol. In addition, it is desirable to add a small amount of an organic base such as triethylamine to the reaction mixture in order to catalyze carbamate formation. The reaction, which is exothermic, proceeds readily without the external addition of heat. When the reaction mixture is heated to reflux for a brief period, such as about thirty minutes, a nearly quantitative yield of carbamate is obtained. The carbamates can be recovered from the reaction mixture by removing unreacted isocyanate under reduced pressure, followed by recrystallization of the residue.

Materials can be protected from attack by insects and nematodes by applying to the material an effective amount of a carbamate prepared in accordance with the preceding paragraph from a naphthol of this invention. The carbamate is applied to the material to be protected in the form of a pesticidal composition comprising the carbamate and a suitable diluent which forms a fine dispersion of the carbamate on plants or other materials to be protected. Suitable solid diluents include talcums, diatomaceous earth, wood flours, and silica gels. When the diluent is a solid, the composition preferably contains from 0.1 to 1.0 weight percent of the carbamate. Suitable liquid diluents include water, acetone, petroleum distillates and the like. Where the diluent is a liquid, the composition can contain as little as about 0.5 pound of carbamate per 100 gallons of diluent, the preferred concentration being from 0.5 to 2 pounds of carbamate per 100 gallons of diluent. Other pesticidal adjuvants, including conventional wetting, dispersing, and emulsifying agents, can also be added to the formulation. The amount of carbamate deposited on the material can range from 0.01 to 1.0, preferably 0.1 to 0.5 pound of carbamate per square yard of material. No phytotoxicity is shown by the carbamates.

The following examples further illustrate the invention. In each of the examples the reaction products were identified by infrared spectrum and nuclear magnetic resonance analyses.

Examples 1–12

Derivatives of phenol were cyclialkylated by reaction with 1,5-hexadiene in the presence of aluminum phenate. Aluminum phenate was prepared in situ by heating a suspension of the phenol and aluminum to between 150° C. and 200° C. until hydrogen evolution had ceased. 1,5-hexadiene was then added slowly at a rate such that the temperature of the reaction mixture did not drop below 160° C. The reaction mixture was held at the indicated temperature for the indicated period of time after the addition was completed. The reaction mixture was then cooled, poured onto a system of ice and hydrochloric acid, extracted with ether and then dried over sodium sulfate. The desired 5,8-dimethyl-5,6,7,8-tetrahydro-1-naphthol was then isolated by distillation. The results obtained are tabulated above in Table I.

Example 13

One-half ml. of triethylamine was added to a stirred solution of 3.8 grams of 5,8-dimethyl-5,6,7,8-tetrahydro-1-naphthol and 10 ml. of methyl isocyanate. When the initial reaction had moderated, the solution was heated to reflux for 15 minutes, cooled, and the excess isocyanate removed under reduced pressure. The viscous oil that remained was recrystallized from chloroform-hexane to give 2.1 grams of product. Concentration of the mother liquor afforded an additional 1.0 gram of product. Two recrystallizations of the product from hexane gave white crystals, melting point 100.5–102° C., identified as N-methyl (5,8-dimethyl-5,6,7,8 - tetrahydro - 1 - naphthyl) carbamate.

The carbamate prepared above was diluted with a 1:1 solution of acetone and water to a concentration corresponding to one pound of carbamate per 100 gallons of diluent. The solution was sprayed on cranberry bean plants which were subsequently infested with Mexican bean beetle larvae after the solution had dried on the plants. The solution was also sprayed on English broad bean plants and pea aphid adults, separately, and then the aphids were placed on the treated plants. In addition, the solution was sprayed on cranberry bean plants infested with two-spotted spider mites. A portion of the solution was stripped of acetone, diluted with water to a concentration of 500 p.p.m. of carbamate, combined with 0.1 percent by weight of Triton X–155 wetting agent, and sprayed on sour mash nematodes (*Panagrellus redivivus*). Mortality observations were made three days after treatment. The percent of nematodes killed was estimated by visual inspection under a microscope. The results are reported in Table II.

Examples 14–21

Other N-methyl carbamates were prepared following the general procedure of Example 13 from certain of the other naphthols prepared in Examples 1–12. These carbamates were similarly tested for pesticidal effectiveness following the procedure of Example 13, with the exception that the concentration of the carbamate was equivalent to two pounds of carbamate per 100 gallons of diluent. The results are reported below in Table II.

TABLE II

| Carbamate | Percent killed | | | |
|---|---|---|---|---|
| | MBBL[1] | PAA[2] | TSSM[3] | NEM[4] |
| Unsubstituted | 100 | 80 | 7 | 35 |
| 4-methyl | 100 | 0 | 5.9 | 20 |
| 4-chloro | 100 | 0 | 18.7 | 10 |
| 2-methyl | 20 | 0 | 14.3 | 100 |
| 4-ethyl | 40 | 100 | 4.2 | 10 |
| 2-isopropyl | 0 | 10 | 17.6 | 5 |
| 4-methoxy | 40 | 0 | 13.3 | 10 |
| 3-methyl | 100 | 100 | 57.1 | 10 |

[1] Mexican bean beetle larvae.
[2] Pea aphid adults.
[3] Two-spotted spider mites.
[4] Sour mash nematodes.

TABLE I

| Phenol | Grams phenol | Grams aluminum | Grams 1,5-hexadiene | Reaction temp., ° C. | Reaction time, hours | Grams 5,6,7,8-tetra-hydro-1-naphthol (yield) | Boiling point. ° C./mm.Hg |
|---|---|---|---|---|---|---|---|
| Unsubstituted | 150 | 3 | 34.6 | 180–185 | 3.5 | 41 | 98–100/1.0 |
| 2-methyl | 208 | 3 | 51.7 | 160–170 | 4 | 78 | 92–93/0.5 |
| 3-methyl | 200 | 4 | 51.7 | 170–170 | 4 | 39 | 120–130/0.2–0.3 |
| 4-methyl | 220 | 4 | 51.7 | 160–185 | 5 | 58 | 99–103/0.25 |
| 4-ethyl | 200 | 4 | 51.7 | 190–215 | 6 | 42 | 110–114/0.8 |
| 2-isopropyl | 135 | 3 | 34.6 | 200–215 | 2 | 56 | 110–113/0.3 |
| 4-methoxy | 200 | 4 | 51.7 | 215–230 | 2 | 51 | 135–145/0.5 |
| 2-chloro | 209 | 4 | 51.7 | 170–180 | 1.5 | 37 | 90–95/0.25 |
| 4-chloro | 208 | 4 | 51.7 | 170–190 | 1.5 | 30 | 110–115/0.25 |
| 4-n-propyl | 98 | 2 | 51.7 | 200–225 | 12 | 37 | 130–150/0.7–1.0 |
| 2,4-dimethyl | 94 | 2 | 51.7 | 190–210 | 4 | 54 | 120–124/0.6 |
| 4-fluoro | 100 | 2 | 25.8 | 175–185 | 3 | 18 | 96–109/0.8–1.0 |

We claim:
1. A process for preparing 5,8-dimethyl-5,6,7,8-tetrahydro-1-naphthols having the formula

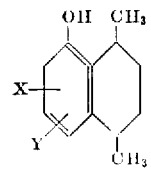

wherein X and Y independently occupy the 2, 3, or 4 positions and are independently selected from the group consisting of hydrogen, fluorine, chlorine, bromine, lower alkoxy and lower alkyl, which process comprises reacting 1,5-hexadiene with a phenolic reactant having the formula

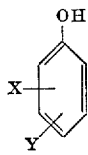

wherein X and Y have the meanings given above, in the presence of aluminum phenate at a temperaure between about 125° C. and about 250° C.

2. The process of claim 1 wherein X or Y is lower alkoxy and the other substituent is hydrogen.

3. The process of claim 1 wherein X or Y is fluorine, chlorine or bromine and the other substituent is hydrogen.

4. The process of claim 1 wherein X or Y is fluorine, chlorine or bromine and the other substituent is a like halogen.

5. The process of claim 1 wherein X or Y is lower alkyl and the other substituent is hydrogen.

6. The process of claim 1 wherein X and Y are lower alkyl.

7. The process of claim 1 wherein the weight ratio of aluminum phenate to 1,5-hexadiene is from about 1:100 to about 1:0.5.

8. The process of claim 1 wherein the weight ratio of aluminum phenate to 1,5-hexadiene is from about 1:10 to about 1:1.

9. The process of claim 8 wherein the reaction is carried out at a temperature ranging from about 160° C. to about 230° C.

References Cited

UNITED STATES PATENTS

| | | | |
|---|---|---|---|
| 2,198,374 | 4/1940 | Bruson et al. | 260—619 F |
| 2,553,470 | 5/1951 | Pines et al. | 260—621 R X |
| 3,267,153 | 8/1966 | Leston | 260—621 R X |

FOREIGN PATENTS

| | | | |
|---|---|---|---|
| 1,346,184 | 11/1963 | France | 260—621 R |
| 776,204 | 6/1957 | Great Britain | 260—624 C |

OTHER REFERENCES

Bruson et al.: J.A.C.S., vol. 62 (1940), pp. 36–44.

BERNARD HELFIN, Primary Examiner

U.S. Cl. X.R.

260—621 R, 623 R, 624 R